United States Patent
Murayama et al.

[11] 3,933,735
[45] Jan. 20, 1976

[54] 4-PIPERIDONE DERIVATIVES, THEIR PREPARATION AND THEIR USE AS STABILIZERS

[75] Inventors: Keisuke Murayama; Susumu Higashida; Katsuaki Matsui; Tomoyuki Kurumada; Noriyuki Ohta; Hisayu Ohsawa, all of Tokyo, Japan

[73] Assignee: Sankyo Company Limited, Japan

[22] Filed: May 15, 1974

[21] Appl. No.: 470,309

Related U.S. Application Data

[62] Division of Ser. No. 325,742, Jan. 22, 1973.

[30] Foreign Application Priority Data
Jan. 26, 1972  Japan.................................. 47-9670
Feb. 22, 1972  Japan.................................. 47-18346

[52] U.S. Cl................... 260/45.8 N; 260/45.8 SN; 260/45.8 NZ; 260/293.89
[51] Int. Cl.².............................................. C08K 5/00
[58] Field of Search ................ 260/45.8 N, 45.8 NZ

[56] References Cited
UNITED STATES PATENTS
2,739,969  3/1956  Sperber et al. ................. 260/293.68
3,513,170  5/1970  Murayama et al............ 260/45.8 N OTHER PUBLICATIONS
McElvain et al., JACS, Vol. 70, 1948, pp. 1820–1825.

Primary Examiner—M. J. Welsh
Attorney, Agent, or Firm—Toren, McGeady and Stanger

[57] ABSTRACT

4-Piperidone derivatives having the formulae

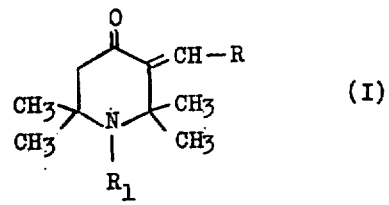

and

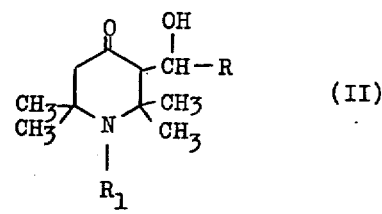

wherein R represents a phenyl or naphthyl group which may be substituted with nitro, lower alkyl, halogen, hydroxyl, lower alkyl hydroxy, hydroxy lower alkyl or formyl or a 5- or 6-membered heterocyclic group having as a hetero atom at least one of oxygen atom, sulfur atom and nitrogen atom and $R_1$ represents hydrogen atom or an alkyl group of 1 to 4 carbon atoms. They are useful as stabilizers for various synthetic polymers against their photo- and thermal-deteriorations and the 4-piperidone derivatives (II) are prepared from the corresponding 2,2,6,6-tetramethyl-4-oxopiperidine derivatives by reaction with an aldehyde and the 4-piperidone derivatives (I) are prepared from the 4-piperidone derivatives (II) through dehydration.

7 Claims, No Drawings

4-PIPERIDONE DERIVATIVES, THEIR PREPARATION AND THEIR USE AS STABILIZERS

This is a division of application Ser. No. 325,742, filed Jan. 22, 1973.

This invention relates to new 4-piperidone derivatives, their preparation and their use as stabilizers.

More particularly, this invention is concerned with the 4-piperidone derivatives having the formulae

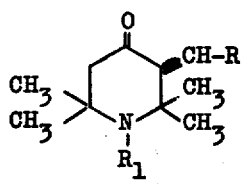

and

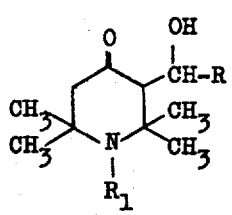

wherein R represents a phenyl or naphthyl group which may be substituted with nitro, lower alkyl, halogen, hydroxy, lower alkyl hydroxy, hydroxy lower alkyl or formyl or a 5- or 6-membered heterocyclic group having as a hetero atom at least one of oxygen atom, sulfur atom and nitrogen atom and $R_1$ represents hydrogen atom or an alkyl group of 1 to 4 carbon atoms. It is further concerned with the process for the preparation of the 4-piperidone derivatives (I) and (II) and also with the stabilization of synthetic polymers against photo- and thermal-deteriorations thereof by having incorporated therein, in a sufficient amount to prevent said deterioration, at least one of the 4-piperidone derivatives (I) and (II).

In the above formulae (I) and (II), the optional substituent in the phenyl or naphthyl moiety of R may be illustrated by nitro; lower alkyl, preferably of 1 to 4 carbon atoms, e.g., methyl, ethyl, n-propyl, isopropyl, n-butyl or tert.-butyl; halogen, e.g., chlorine, bromine, iodine, fluorine; hydroxy; lower alkyl hydroxy, e.g., methoxy or ethoxy; hydroxy lower alkyl, e.g., hydroxymethyl or hydroxyethyl; or formyl. The heterocyclic group as defined above may be illustrated by 2-furyl, 2-thienyl, 3-pyrrolyl, 2-pyridyl or 4-pyridyl. These substituents may occupy any position of the phenyl or naphthyl moiety other than that linked to the carbon atom of the side chain.

The 4-piperidone derivatives having the above formula (I) as described herein are contemplated to include two types of steroisomers: Specifically speaking, they may include both the Z-isomers wherein the group R attached to the carbon atom in the side chain and the carbonyl group involved in the piperidine ring are on the same side of the double bond and the E-isomers wherein the group R and the carbonyl group are on the opposite side of the double bond.

The term "synthetic polymer" as used herein is intended to embrace polyolefins including homopolymers of olefins such as low-density and high-density polyethylene, polypropylene, polystyrene, polybutadiene, polyisoprene and the like, and copolymers of olefins with other ethylenically unsaturated monomers such as ethylene-propylene copolymer, ethylene-butene copolymer, ethylene-vinyl acetate copolymer, styrene-butadiene copolymer, acrylonitrile-styrene-butadiene copolymer and the like;

polyvinyl chlorides and polyvinylidene chlorides including homopolymer of each of vinyl chloride and vinylidene chloride, vinyl chloride-vinylidene chloride copolymer and copolymers of each of vinyl chloride and vinylidene chloride with vinyl acetate or other ethylenically unsaturated monomers;

polyacetals such as polyoxymethylene and polyoxyethylene; polyesters such as polyethylene terephthalate; polyamides such as 6-nylon, 6,6-nylon and 6,10-nylon; and polyurethanes.

Synthetic polymers have been widely utilized in the art, in view of their excellent properties, in various forms or shapes, for example, filament, fibre, yarn, film, sheet, other molded article, latex and foam. However, these polymers have some drawbacks such as poor light-and heat-stabilities and the like. Stated illustratively, polyolefins and polyurethane elastomers frequently tend to undergo severe deterioration when exposed to light such as sunlight or ultraviolet ray, and polyvinyl chloride and polyvinylidene chloride frequently tend to deteriorate and become colored by the action of light and heat together with elimination of hydrogen chloride therefrom. Polyamides are also frequently subjected to photo-deterioration. For the purpose of stabilizing these synthetic polymers against such deterioration, there have heretofore been proposed in the art a number of stabilizers; for example, for polyolefins, benzotriazole compounds and benzophenone compounds; for polyurethanes, phenol compounds and benzophenone compounds; and for polyvinyl chloride and polyvinylidene chloride, lead salts such as basic lead silicate and tribasic lead maleate, and organotin compounds such as dibutyltin laurate and dibutyltin maleate.

Although such prior stabilizers are known to be considerably satisfactory, there still remained some problems to be improved.

Thus, numerous attempts have been made in the art to find and develop new and more effective stabilizers.

As a result of our extensive studies, it has now been found that the new 4-piperidone derivatives (I) and (II)

of this invention can be satisfactorily prepared and exhibit a high stabilizing effect against photo- and thermal-deteriorations of the synthetic polymers.

It is, accordingly, an object of this invention to provide new and useful 4-piperidone derivatives (I) and (II).

Another object is to provide a process for the preparation of the valuable 4-piperidone derivatives (I) and (II).

Still another object is to provide synthetic polymer composition stabilized against the deterioration thereof by having incorporated therein, in a sufficient amount to prevent the deterioration, at least one of the 4-piperidone derivatives (I) and (II).

Other objects of this invention will become apparent to those skilled in the art from the following description.

In one aspect of this invention, the 4-piperidone derivatives (I) and (II) are all new substances unknown in the art.

Representative of the 4-piperidone derivatives of the above formulae (I) and (II) are as follows:

| Compound No. | Chemical Name |
|---|---|
| 1 | 3-(α-hydroxybenzyl)-2,2,6,6-tetramethyl-4-oxopiperidine |
| 2 | 3-(α-hydroxy-m-nitrobenzyl)-2,2,6,6-tetramethyl-4-oxopiperidine |
| 3 | 3-(α-hydroxyfurfuryl)-2,2,6,6-tetramethyl-4-oxopiperidine |
| 4 | 3-(α-hydroxy-p-methylbenzyl)-2,2,6,6-tetramethyl-4-oxopiperidine |
| 5 | 3-(α-hydroxy-p-formylbenzyl)-2,2,6,6-tetramethyl-4-oxopiperidine |
| 6 | 3-(α-hydroxy-α-naphthylmethyl)-2,2,6,6-tetramethyl-4-oxopiperidine |
| 7 | 3-(α-hydroxy-2-pyridylmethyl)-2,2,6,6-tetramethyl-4-oxopiperidine |
| 8 | 3-(α-hydroxybenzyl)-1,2,2,6,6-pentamethyl-4-oxopiperidine |
| 9 | 3-Z-benzylidene-2,2,6,6-tetramethyl-4-oxopiperidine |
| 10 | 3-E-benzylidene-2,2,6,6-tetramethyl-4-oxopiperidine |
| 11 | 3-Z-furfurylidene-2,2,6,6-tetramethyl-4-oxopiperidine |
| 12 | 3-E-furfurylidene-2,2,6,6-tetramethyl-4-oxopiperidine 2 |
| 13 | 2,2,6,6-tetramethyl-3-Z-(m-nitrobenzylidene)-4-oxopiperidine |
| 14 | 2,2,6,6-tetramethyl-3-Z-(p-methylbenzylidene)-4-oxopiperidine |
| 15 | 3-Z-(p-formylbenzylidene)-2,2,6,6-tetramethyl-4-oxopiperidine |
| 16 | 3-Z-(p-hydroxymethylbenzylidene)-2,2,6,6-tetramethyl-4-oxopiperidine |
| 17 | 3-Z-benzylidene-1,2,2,6,6-pentamethyl-4-oxopiperidine |

The above-listed compounds are frequently and hereinbelow referred to as their compound Nos.

Of the 4-piperidone derivatives (I) and (II) of this invention, those derivatives designated by Compound Nos. 1, 3, 4, 9, 10, 11, 12 and 14 are particularly preferable in view of their stabilizing effects against photo- and thermal-deteriorations of synthetic polymers.

In another aspect of this invention, there is provided the process for the preparation of the 4-piperidone derivatives having the above formulae (I) and (II) as illustratively shown by the following reaction schema:

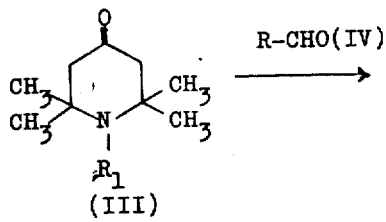

(III)

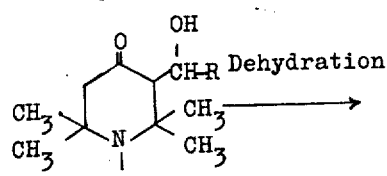

(II)

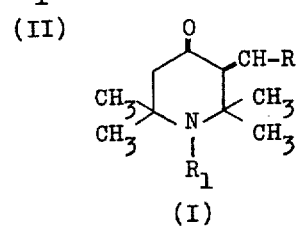

(I)

In the above formulae, R and R₁ are as defined above.

One step of the process of this invention for the preparation of the 4-piperidone derivatives (II) comprises reacting the starting 4-piperidone derivative having the above formula (III) with the aldehyde having the above formula (IV).

In carrying out this step, it is preferable to conduct the reaction in the presence of a base catalyst or a carbanion-producing agent. Examples of the catalyst which may be employed are hydroxides, carbonates or alkoxides of alkali metal or alkaline earth metal, e.g., sodium hydroxide, potassium hydroxide, calcium hydroxide, barium hydroxide, sodium carbonate, potassium carbonate, calcium carbonate, barium carbonate, sodium methoxide, sodium ethoxide and the like, sodium hydroxide being preferable. Where the base catalyst is employed, it may be advantageously employed in the reaction in its aqueous solution form. The reaction temperature is not critical, but the reaction can be preferably effected at room temperature. The reaction period of time is not critical and may vary depending upon the reaction temperature and other factors, but the reaction is usually completed within about 1 to 15 hours. After completion of the reaction, the desired product (II) may be readily recovered and purified by a conventional method. For instance, the crystalline mass separated in situ is recovered by filtration and purified by washing with water followed by recrystallization from a suitable solvent such as benzene.

Alternatively, this step may be effected by reacting the starting 4-piperidone derivative (III) with the aldehyde (IV) in the presence of a carbanion-producing agent, preferably in the presence of an organic solvent under an inert atmosphere. Examples of the carbanion-producing agent which may be employed are alkyl alkali metals, e.g., butyl lithium, alkali metal alkoxides, e.g., sodium methoxide or sodium ethoxide; alkali metal hydrides, e.g., sodium hydride; alkali metal amides, e.g., sodium amide; and the like. Examples of the organic solvent are alcohols, e.g., methanol or ethanol, aromatic hydrocarbons, e.g., benzene, toluene or xylene and ethers, e.g., ether or terahydrofuran, preferably these solvents being anhydrous. As explained above, the reaction may be preferably conducted under an inert atmosphere such as gaseous nitrogen, helium or argon. The reaction temperature is not critical, but the reaction may be usually effected at a temperature of about 0°–80°C. The reaction period of time is not critical, but the reaction is usually completed within about 1 to 10 hours. After completion of the reaction, the desired product (II) may be readily recovered and purified by a conventional method. For instance, the reaction mixture is poured into a dilute aqueous solution of hydrochloric acid cooled with ice, an acidic aqueous layer is separated and saturated with an alkali carbonate such as sodium carbonate or potassium carbonate. Extraction of the saturated aqueous layer with an organic solvent and concentration can give the desired product (II).

Another step of the process of this invention for the preparation of the 4-piperidone derivatives (I) from the 4-piperidone derivatives (II) comprises subjecting the 4-piperidone derivatives (II) obtained from the above-mentioned step to dehydration.

In carying out this step, the reaction may be readily effected by treating the 4-piperidone derivative (II) with a dehydrating agent. Examples of the dehydrating agent which may be employed are acid anhydrides, e.g., acetic anhydride or phosphoric anhydride and acid halides, e.g., acetyl chloride, benzoyl chloride or p-toluenesulfonyl chloride, acetic anhydride being preferable. The reaction may also be effected in the presence of an organic solvent such as aromatic hydrocarbons, e.g., benzene or toluene. The reaction temperature is not critical, but the reaction may be usually effected at room temperature or a reflux temperature of the organic solvent employed. The reaction period of time is not critical and may vary depending upon the reaction temperature and other factors, but the reaction is usually completed within about 5 to 15 hours. In some cases, it is preferable to externally cool the reaction system when the dehydrating agent is added thereto. After completion of the reaction, the desired product (I) may be readily recovered and purified by a conventional method. For instance, where an acid is formed in situ through dehydration, the reaction mixture is neutralized with a suitable base and then extracted with a suitable organic solvent. Then, the solvent is distilled off and the residue is recrystallized from a suitable organic solvent or distilled under reduced pressure to give the desired product (I).

In still another aspect of this invention, there is provided a synthetic polymer composition stabilized against photo- and thermal-deteriorations wherein there is incorporated, in a sufficient amount to prevent said deterioration, at least one compound selected from the 4-piperidone derivatives (I) and (II).

According to this invention, the 4-piperidone derivatives (I) and (II) employed as a stabilizer in the present invention may be readily incorporated into the synthetic polymers by any of the various standard procedures commonly utilized in the art. The stabilizer may be incorporated into the synthetic polymers at any desired stage prior to the manufacture of shaped articles therefrom. Thus, for example, the stabilizer in the form of a dry powder may be admixed with the synthetic polymer, or a suspension or emulsion of the stabilizer may be admixed with a solution, suspension or emulsion of the synthetic polymer.

The amount of the 4-piperidone derivatives (I) and (II) employed in the synthetic polymer in accordance with the present invention may be varied widely, depending upon the types, properties and particular uses of the synthetic polymer to be stabilized. In general, the 4-piperidone derivatives of the formulae (I) and (II) may be added in an amount ranging from 0.01 to 5.0% by weight, based on the amount of the synthetic polymer, but the practical range is varied depending upon the type of the synthetic polymer, that is 0.01 to 2.0% by weight, preferably 0.02 to 1.0% by weight for poly-olefins, 0.01 to 1.0% by weight, preferably 0.02 to 0.5% by weight for polyvinyl chloride and plyvinylidene chloride, and 0.01 to 5.0% by weight, preferably 0.02 to 2.0% by weight for polyurethanes and polyamides.

The present stabilizer may be used alone or in combination with other known additives such as antioxidants, ultraviolet absorbers, fillers, pigments and the like. Examples of the antioxidants include the phenol type compounds, e.g., 2.6-di-tert.-butyl-p-cresol, 4,4'-thiobis(6-tert.-butyl-3-methylphenol), 2,2'-thiobis-(6-tert.-butyl-4-methylphenol), 4,4'-bis(2,6-di-tert.-butylphenol), 4,4'-bis(2,6-diisopropyl phenol), 2,4,6-triisopropyl phenol, 4,4'-butylidene bis(6-tert.-butyl-3-methylphenol), 1,1,3-tris(5-tert.-butyl-4-hydroxy-2-methylphenyl)butane, tetrakis [β-3,5-di-tert.-butyl-4-hydroxyphenyl)propionyloxymethyl]methane, 2,4,6-tris(3,5-di-tert.-butyl-4-hydroxy benzyl)mesitylene; the thiodipropionate type compounds, e.g., dilauryl thiodipropionate; and the alkyl, aryl- or alkaryl-phosphites, e.g., triphenyl phosphite, tris-(p-nonyl)phenyl phosphite, diphenyl decyl phosphite. Examples of the ultraviolet absorbers include the benzotriazole type compounds, e.g., 2-(2'hydroxy-5'-methylphenyl)benzotriazole, 2-(3',5'-di-tert.-butyl-2'-hydroxyphenyl)-5-chlorobenzotriazole; the salicylate type compounds, e.g., 4-tert.-butylphenyl salicylate; the benzophenone type compounds, e.g., 2-hydroxy-4-oxtoxybenzophenone; and 2',4'-di-tert.-butylphenyl-3,5-di-tert.-butyl-4-hydroxybenzoate, methyl-α-cyano-β-methyl-β-(p-methoxyphenyl)acrylate and [2,2'-thiobis(4-tert.-octylphenolate)]-n-butylamine Ni (II).

If desired, two or more of the 4-piperidone derivatives (I) and (II) and may be satisfactorily utilized in this invention.

The other additives as depicted above may be usually employed together with the 4-piperidone derivatives of this invention at a ratio of 0.5 – 3 to 1.

In order that the invention may be better understood, the following Examples are given solely for the purpose of illustration of this invention. In the Examples, all parts are given by weight unless otherwise indicated and the compound number of the stabilizing compound as used hereinbelow is the same as illustratively shown above.

Examples 1 through 15 describe the preparation of the 4-piperidone derivatives of this invention.

Examples 16 through 20 describe the synthetic polymer compositions having incorporated therein the 4-piperidone derivatives and their stabilization effects.

EXAMPLE 1

3-(α-Hydroxybenzyl)-2,2,6,6-tetramethyl-4-oxo-piperidine

To a mixture of 102.5g of triacetonamine monohydrate and 63g. of benzaldehyde in 100 ml. of water was added with stirring 12g. of an 10% aqueous solution of sodium hydroxide. After completion of the addition, the mixture was stirred at room temperature for additional 6 hours. Crystalline mass thus separated was recovered by filtration, washed with water and then with benzene and recrystallized from benzene to give the desired product as white crystals having a decomposition point of 175° – 176°C.

Analysis for $C_{16}H_{23}NO_2$: Calculated: C, 73.57%; H, 8.87%; N, 5.36% Found: C, 73.37%; H, 8.93%; N, 5.38%

Mass spectrum: Calculated Molecular Weight 261, M⁺ 261

IR spectrum (Wujol mull): $\nu_{OH}$ 3050 cm⁻¹, $\nu_{C=O}$ 1700 cm⁻¹.

According to the same procedure as shown in Example 1, the compounds of Examples 2 and 3 were prepared.

EXAMPLE 2

3-(α-Hydroxy-m-nitrobenzyl)-2,2,6,6-tetramethyl-4-oxopiperidine

White crystals having a decomposition point of 170° – 171°C.

Analysis for $C_{14}H_{22}N_2O_4$: Calculated: C, 62.72%; H, 7.24%; N, 9.14% Found: C, 62.90%; H, 7.37%; N, 9.07%

Mass spectrum: Calculated Molecular Weight 306, M⁺ 306

IR spectrum (Nujol mull): $\nu_{OH}$ 2750 cm⁻¹, $\nu_{C=O}$ 1700 cm⁻¹.

EXAMPLE 3

3-(α-Hydroxyfurfuryl)-2,2,6,6-tetramethyl-4-oxopiperidine

Pale yellow crystals having a decomposition point of 144° – 145°C.

Analysis for $C_{14}H_{21}NO_3$: Calculated: C, 66.90%; H, 8.42%; N, 5.57% Found: C, 66.63%; H, 8.49%; N, 5.67%

Mass spectrum: Calculated Molecular Weight 251, M⁺ 251

IR spectrum (Nujol mull): $\nu_{OH}$ 2750 cm⁻¹, $\nu_{C=O}$ 1700 cm⁻¹.

EXAMPLE 4

3-(α-Hydroxy-p-methylbenzyl)-2,2,6,6-tetramethyl-4-oxopiperidine

To a mixture of 12g. of p-tolualdehyde, 15.5g. of triacetone amine and 50 ml. of anhydrous ether was added dropwise 42.6g. of butyl lithium (as a 15% solution in n-hexane) at −50° to −60°C. under a nitrogen gas stream. After completion of the dropwise addition, the mixture was stirred at room temperature for 3 hours. Then, the reaction mixture was poured into 5% dilute hydrochloric acid with ice-cooling. The aqueous layer was separated and saturated with potassium carbonate. Then, the ether layer was separated and concentrated to yield crude crystalline mass. The mass was recrystallized from benzene to give the desired product as white crystals having a decomposition point of 160° – 161°C.

Analysis for $C_{17}H_{25}NO_2$: Calculated: C, 74.14%; H, 9.15%; N, 5.09% Found: C, 74.34%; H, 9.18%; N, 5.27%

IR spectrum (Nujol mull): $\nu_{OH}$ 2750 cm⁻¹, $\nu_{C=O}$ 1700 cm⁻¹.

Mass spectrum: Calculated Molecular Weight 275, M⁺ 275

According to the same procedure as shown in Example 4, the compounds of Examples 5 through 7 were prepared.

EXAMPLE 5

3-(α-Hydroxy-p-formylbenzyl)-2,2,6,6-tetramethyl-4-oxopiperidine

White crystals having a decomposition point of 183° – 184°C.

Analysis for $C_{17}H_{23}NO_3$: Calculated: C, 70.56%; H, 8.01%; N, 4.84%
Found: C, 70.80%; H, 8.03%; N, 4.72%

Mass spectrum: Calculated Molecular Weight 289, M⁺ 289

IR spectrum (Nujol mull): $\nu_{OH}$ 2750 cm⁻¹, $\nu_{C=O}$ 1700 cm⁻¹

NMR spectrum (heavy DMSO soln.) (δ value): 10.25 ppm (singlet, 1H, —C$\underline{H}$O)

EXAMPLE 6

3-(α-Hydroxy-α-naphthylmethyl)-2,2,6,6-tetramethyl-4-oxopiperidine

White crystals having a decomposition point of 174° – 175°C.

Analysis for $C_{20}H_{25}NO_2$: Calculated: C, 77.13%; H, 8.09%; N, 4.50% Found: C, 77.26%; H, 7.89%; N, 4.37%

Mass spectrum: Calculated Molecular Weight 311, M⁺ 311

IR spectrum (Nujol mull): $\nu_{OH}$ 2750 cm⁻¹, $\nu_{C=O}$ 1700 cm⁻¹.

EXAMPLE 7

3-(α-Hydroxy-2-pyridylmethyl)-2,2,6,6-tetramethyl-4-oxopiperidine

White crystals having a decomposition point of 134° – 135°C.

Analysis for $C_{15}H_{22}N_2O_2$: Calculated: C, 68.67%; H, 8.45%; N, 10.68% Found: C, 68.52%; H, 8.63%; N, 10.56%

Mass spectrum: Calculated Molecular Weight 262, M⁺ 262

IR spectrum (Nujol mull): $\nu_{OH}$ 3100 cm⁻¹, $\nu_{C=O}$ 1695 cm⁻¹

Similarly, the following compound was prepared: 3-(α-hydroxybenzyl)-1,2,2,6,6-pentamethyl-4-oxopiperidine, m.p. 78°–79°C.

EXAMPLE 8

3-Z-Benzylidene-2,2,6,6-tetramethyl-4-oxopiperidine

To 80g. of 3-(α-hydroxybenzyl)-2,2,6,6-tetramethyl-4-oxopiperidine was added 62.4g. of acetic anhydride under ice-cooling and the resulting mixture was stirred at room temperature for 10 hours. Thereafter, the reaction mixture was neutralized by addition of potassium carbonate under ice-cooling and extracted with ether. The ether extract was dried and concentrated and the residue was recrystallized from n-hexane to give the 3-Z-benzylidene derivative as white crystals melting at 72° – 73°C. Yield: 46% upon the 3-(α-hydroxybenzyl)-derivative.

Analysis for $C_{16}H_{21}NO$ Calculated: C, 78.97%; H, 8.70%; N, 5.76% Found: C, 78.69%; H, 8.73%; N, 5.70%

IR spectrum (Nujol mull): $\nu_{C=O}$ 1680 cm⁻¹, $\nu_{C=C}$ 1635 cm⁻¹

Mass spectrum: Calculated Molecular Weight 243.34, M⁺ 243

NMR spectru (CCl₄ soln., value): 8.78 (—C$\underline{H}_3$, 6H, singlet), 8.60 (—C$\underline{H}_3$, 6H, singlet), 7.56 (—C$\underline{H}_2$, 2H, singlet), 3.60 (>=<$_H$, 1H), 2.79 (—C₆$\underline{H}_5$, 5H).

EXAMPLE 9

3-E-Benzylidene-2,2,6,6-tetramethyl-4-oxopiperidine

The mother liquor from the recrystallization procedure in the above Example 8 was subjected to distillation under reduced pressure to give the 3-E-benzylidene derivative as colorless liquids boiling at 142°–143°C/3 mmHg.

Yield: 49.3% upon the 3-(α-hydroxybenzyl) derivative.

Analysis for C₁₆H₂₁NO : Calculate: C, 78.97%; H, 8.70%; N, 57.76% Found: C, 78.80%; H, 8.85%; N, 5.81%

IR spectrum (liquid film): $\nu_{C=O}$ 1690 cm⁻¹, $\nu_{C=C}$ 1620 cm⁻¹.

Mass spectrum: Calculated Molecular Weight 243.34, M⁺ 243

NMR spectrum (CCl₄ soln., τ value):
7.57 (—C$\underline{H}_2$—, 2H, singlet), 2.78 (—C₆$\underline{H}_5$, 5H), 2.48 (>=<$\underline{H}$).

Where each methyl proton of the above two compounds is saturated according to a spin decoupling method (Nuclear Oberhouser Effect) of the NMR spectrum, the liquid product shows no increase in integrated intensity of =CH— proton, whereas the crystalline product shows increase by 18 - 19% in integrated intensity and the =CH— proton in the liquid product is shifted to a lower magnetic field. It becmes apparent from the foregoing that the crystalline product is the 3-Z-benzylidene derivative and the liquid product is the 3-E-benzylidene derivative.

According to the same procedures as shown in Examples 8 and 9, the compounds of Examples 10 to 15 were prepared.

EXAMPLE 10

3-Z-Furfurylidene-2,2,6,6-tetramethyl-4-oxopiperidine

Yellow crystals melting at 52° – 53°C.

Analysis for C₁₄H₁₉NO₂: Calculated: C, 72.07%; H, 8.21%; N, 6.00% Found : C, 71.78%; H, 8.20%; N, 5.92%

IR spectrum (Nujol mull): $\nu_{C=O}$ 1680 cm⁻¹, $\nu_{C=C}$ 1588 cm⁻¹

Mass spectrum: Calculated Molecular Weight 233.30, M⁺ 233

NMR spectrum (CCl₄ soln., τ value): 7.59 (—C$\underline{H}_2$—, 2H, singlet).

EXAMPLE 11

3-E-Furfurylidene-2,2,6,6-tetramethyl-4-oxopiperidine

Yellow liquid boiling at 137°–140° C/3 mmHg.

Analysis for C₁₄H₁₉NO₂: Calculated: C, 72.07%; H, 8.21%; N, 6.00% Found: C, 72.32%; H, 8.32%; N, 5.77%

Mass spectrum: Calculated Molecular Weight 233.30, M⁺ 233.

NMR spectrum (CCl₄ soln., τ value): 7.62 (—C$\underline{H}_2$—, 2H, singlet).

EXAMPLE 12

2,2,6,6-Tetramethyl-3-Z-(m-nitrobenzylidene)-4-oxopiperidine

Pale yellow crystals melting at 67° – 68°C.

Analysis for C₁₆H₂₀N₂O₃: Calculated: C, 66,64%; H, 6.99%; N, 9.72% Found: C, 66.73%; H, 7.02%; N, 9.59%

IR spectrum (Nujol mull): $\nu_{C=O}$ 1695 cm⁻¹, $\nu_{C=C}$ 1610 cm⁻¹.

Mass spectrum: Calculated Molecular Weight 288.34, M⁺ 288.

NMR spectrum (CCl₄ soln., τ value): 7.50 (—C$\underline{H}_2$—, 2H singlet), 3.5 (=C$\underline{H}$—, 1H, singlet).

EXAMPLE 13

2,2,6,6-Tetramethyl-3-Z-(p-methylbenzylidene)-4-oxopiperidine

White crystals melting at 78° – 79°C.

Analysis for C₁₇H₂₃NO : Calculated: C, 79.33%; H, 9.01%; N, 5.44% Found: C, 79.09%; H, 9.10%; N, 5.64%

IR spectrum (Nujol mull): $\nu_{C=O}$ 1685 cm⁻¹, $\nu_{C=C}$ 1630 cm⁻¹.

Mass spectrum: Calculated Molecular Weight 257.31, M⁺ 257

NMR spectrum (CCl₄ soln., τ value): 7.70 (—C₆H₄—C$\underline{H}_3$, 3H), 7.57 (—C$\underline{H}_2$—, 2H), 3.63 (=C$\underline{H}$—, 1H).

EXAMPLE 14

3-Z-(p-formylbenzylidene)-2,2,6,6-tetramethyl-4-oxopiperidine

White crystals melting at 69° – 70°C.

Analysis for C₁₇H₂₁NO₂: Calculated: C, 75.24%; H, 7.80%; N, 5.16% Found: C, 74.95%; H, 7.87%; N, 5.14%

IR spectrum (Nujol mull): $\nu_{C=O}$ 1690 cm⁻¹, $\nu_{C=C}$ 1630 cm⁻¹.

Mass spectrum: Calculated Molecular Weight 271.35, M⁺ 271.

NMR spectrum (CCl₄ soln., τ value): 7.52 (—C$\underline{H}_2$—, 2H), 3.53 (=C$\underline{H}$—, 1H), 0.10 (—C$\underline{H}$O, 1H).

EXAMPLE 15

3-Z-(p-hydroxymethylbenzylidene)-2,2,6,6-tetramethyl-4-oxopiperidine

White crystals melting at 152°–153°C.

Analysis for C₁₇H₂₃NO₂: Calculated: C, 74.69%; H, 8.48%; N, 5.12% Found: C, 74.92%; H, 8.55%; N, 4.98%

IR spectrum (Nujol mull): $\nu_{OH}$ 3200 cm⁻¹, $\nu_{C=O}$ 1690 cm⁻¹, $\nu_{C=C}$ 1640 cm⁻¹, $\nu_{C=C}$ 1060 cm⁻¹.

Mass spectrum: Calculated Molecular Weight 273.36, M⁺ 273.

NMR spectrum (CDCl₃ soln., τvalue): 7.43 (—C$\underline{H}_2$—, 2H), 3.90 (-C$\underline{H}_2$OH, 2H), 3.45 (=C$\underline{H}$—, 1H).

Similarly, the following compound was prepared: 3-Z-benzylidene-1,2,2,6,6-pentamethyl-4-oxopiperidine, m.p. 45° – 46°C.

EXAMPLE 16

Into 100 parts of polypropylene ["Noblen JHH-G", trade name, after twice recrystallizations from monochlorobenzene, available from Mitsui Toatsu Chemicals Inc., Japan] was incorporated 0.25 part of each of the stabilizing compounds of this invention as indicated below. The resulting mixture was blended and molten. The molten mixture was molded into a sheet with a thickness of 0.5 mm. under heating and pressure by a conventional technique.

As a control for comparative purpose, polypropylene sheets were formed by repeating the same procedure as described above except that no stabilizing compounds of this invention were employed.

Thereafter, all of these sheets thus prepared were tested for the "brittleness time" (which means the time, expressed in terms of hour, required until the test sheet becomes brittle) under ultraviolet irradiation at 45°C. by means of the fade-meter, "Standard Fade-Meter Type FA-1" manufactured and sold by Toyo Rika Instruments, Inc., Japan. Such an instrument is a modification of Atlas Fade-O-meter Type FDA-R (Atlas Electric Devices Co., U.S.A.) and meets the requirements prescribed in the item 3.8 of Japanese Industrial Standard "L 1044".

The results are set forth in the following Table I.

Table I.

| Stabilizing compound Compound No. | Brittleness time (hrs.) |
|---|---|
| 1 | 320 |
| 2 | 360 |
| 3 | 560 |
| 8 | 240 |
| 9 | 460 |
| 10 | 320 |
| 11 | 380 |
| 14 | 480 |
| 17 | 280 |
| None | 60 |

EXAMPLE 17

Into 100 parts of high-density polyethylene ["Hi-Zex", trade name, available from Mitsui Toatsu Chemicals Inc., Japan, employed after twice recrystalizations from toluol] were incorporated 0.25 part of each of the stabilizing compounds of this invention indicated below. The resulting mixture was made into a sheet by the same procedure as in the above Example 16.

The sheet thus formed was tested for the brittleness time by the same test method as in the above Example 16. The results are given in the following Table II.

Table II.

| Stabilizing compound Compound No. | Brittleness time (hrs.) |
|---|---|
| 9 | 780 |
| 10 | 760 |
| 11 | 700 |
| 13 | 540 |
| 14 | 820 |
| 15 | 620 |
| 16 | 680 |
| None | 360 |

EXAMPLE 18

Into 100 parts of 6-nylon ["CM 1011", trade name, available from Toray Industries Inc., Japan] was incorporated 0.25 part of each of the stabilizing compound of this invention as indicatedicated below. The resulting mixture was heated and melted and then molded into a film having a thickness of 0.1 mm. under pressure by a conventional compression molding machine. The film thus formed was aged under the following aging condition and thereafter subjected to a tensile test to determine the retentions of tensile strength and elongation by a standard method.

AGING TEST

Exposure to ultraviolet ray for 300 hours in the Fade Meter described in the above Example 1 at 45°C.

The results are given in the following Table III.

TABLE III.

| Stabilizing compound Compound No. | Retention of elongation(%) | Retention of tensile strength (%) |
|---|---|---|
| 9 | 72 | 79 |
| 10 | 63 | 68 |
| 11 | 66 | 65 |
| 14 | 67 | 70 |
| None | 11 | 40 |

EXAMPLE 19

Into 100 parts of polyurethane prepared from polycaprolactone ["E-5080", trade name, available from The Nippon Elastollan Industries Ltd., Japan] was incorporated 0.5 part of each of the stabilizing compounds of this invention indicated below. The resulting mixture was heated and melted and then molded into a sheet having a thickness of about 0.5 mm. The sheet thus formed was subjected to the exposure to ultraviolet ray in the Fade Meter as specified in the above Example 16 at 45°C. for 15 hours and then tested for the retentions of ultimate elongation and ultimate tensile strength as in the above Example 18.

The results are given in the following Table IV.

Table IV.

| Stabilizing Compound No. | Retention of elongation(%) | Retention of tensile strength (%) |
|---|---|---|
| 1 | 91 | 89 |
| 9 | 90 | 88 |
| 10 | 87 | 84 |
| 11 | 86 | 84 |
| 14 | 85 | 81 |
| None | 78 | 50 |

EXAMPLE 20.

Into 100 parts of polyvinyl chloride ["Geon 103EP", trade name, available from The Japanese Geon Co., Ltd., Japan] were incorporated 1.0 part of lead stearate, 0.5 part of dibasic lead phosphite, 0.5 part of cadmium stearate, 0.5 part of barium stearate and 0.2 part of each of the stabilizing compounds of this invention as indicated below. The resulting mixture was kneaded for 4 minutes on a kneading roll at 180°C. and formed into a sheet with a thickness of about 0.5 mm.

The sheet thus formed was aged under the following aging condition to observe the discoloration of the sheet.

AGING TEST

1. Exposure for 600 hours to the Fade Meter as described in the above Example 16.
2. Aging at 170°C. for 90 minutes in the Geer's aging tester as prescribed in Japanese Industrial Standard JIS K 6301 entitled "Physical Testing Method for Vulcanized Rubber", Paragraph 6.5. The results are given in the following Table V.

Table V.

| Stabilizing compound Compound No. | Fade meter | Geer's tester |
| --- | --- | --- |
| 9 | Yellow | Yellow |
| 10 | " | " |
| 11 | " | Pale yellow |
| 13 | " | " |
| 14 | " | Brown |
| 15 | " | " |
| None | Dark brown | Black |

From the above results it can be seen that the 4-piperidone derivatives of this invention exhibit a high degree of stabilizing effect on synthetic polymers against deteriorations thereof.

What is claimed is:

1. A synthetic polymer composition stabilized against photo- and thermal-deterioration wherein there is incorporated, in a sufficient amount to prevent said deterioration, a compound selected from the group consisting of the 4-piperidone derivatives having the formulae

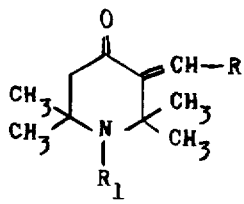

(I)

and

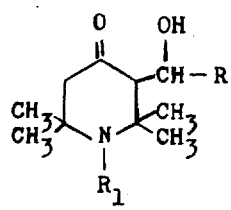

(II)

wherein R represents a phenyl or naphthyl group which may be substituted with nitro, lower alkyl, halogen, hydroxy, lower alkyl hydroxy, hydroxy lower alkyl or formyl or a 5— or 6— membered heterocyclic group having as a hetero atom a member selected from the group consisting of oxygen, sulfur and nitrogen and $R_1$ represents hydrogen atom or an alkyl group of 1 to 4 carbon atoms.

2. The synthetic polymer composition according to claim 1 wherein said 4-piperidone derivative is incorporated in an amount of 0.01 - 5.0% by weight, based upon the amount of the synthetic polymer.

3. The synethic polymer composition according to claim 1 wherein said polymer is a polyolefin.

4. The synthetic polymer composition according to claim 1 wherein said polymer is a polyvinyl chloride.

5. The synthetic polymer composition according to claim 1 wherein said polymer is a polyurethane.

6. The synthetic polymer composition according to claim 1 wherein said polymer is a polyamide.

7. The synthetic polymer composition according to claim 1 wherein said 4-piperidone derivative is selected from
3-(α-hydroxybenzyl)-2,2,6,6-tetramethyl-4-oxopiperidine,
3-(α-hydroxyfurfuryl)-2,2,6,6-tetramethyl-4-oxopiperidine,
3-(α-hydroxy-p-methylbenzyl)-2,2,6,6-tetramethyl-4-oxopiperidine,
3-Z-benzylidene-2,2,6,6-tetramethyl-4-oxopiperidine,
3-E-benzylidene-2,2,6,6-tetramethyl-4-oxopiperidine,
3-Z-furfurylidene-2,2,6,6-tetramethyl-4-oxopiperidine,
3-E-furfurylidene-2,2,6,6-tetramethyl-4-oxopiperidine
and
2,2,6,6-tetramethyl-3-Z-(p-methylbenzylidene)-4-oxo-piperidine.

* * * * *